Patented Apr. 5, 1949

2,466,392

UNITED STATES PATENT OFFICE 2,466,392

OPTICAL GLASS

Paul F. De Paolis, Rochester, N. Y., assignor to Eastman Kodak Company, Rochester, N. Y., a corporation of New Jersey No Drawing. Application August 4, 1945, Serial No. 609,022

3 Claims. (Cl. 106—47)

This application relates to glass having optical values in a range that is useful for the designing of optical instruments. Specifically, this application relates to such glass having an index of refraction for the D line ($n_D$) in the range between 1.65 and 1.68 and an Abbe value ($\nu$) between 52.5 and 57.0.

In general, the glasses herein described are non-silicate and embody as the glassifier boric oxide in an amount between 35 and 40 per cent by weight; lanthanum and thorium oxides in substantially equal amounts, greater than ten per cent, of each; and barium oxide and either calcium or magnesium oxide. It has been found that these oxides under usual glass-making conditions are compatible to form a glass having useful optical characteristics and good physical properties, such as transparency, weather resistance, and hardness, and capable of taking a high optical polish and of withstanding the usual processes of manufacture into lenses.

Three formulas illustrative of my invention follow, percentages being by weight, and the oxide of the elements mentioned being referred to. It is to be understood that in making up the original batch, the ingredients may not be in the form of the oxides, as given, but in such case they are reduced to the oxides in the furnace.

|            | A     | B     |
|------------|-------|-------|
| Boron      | 36    | 36    |
| Lanthanum  | 12    | 12    |
| Thorium    | 12    | 12    |
| Barium     | 20    | 20    |
| Calcium    | 20    |       |
| Magnesium  |       | 20    |
| $n_D$      | .1688 | 1.659 |
| $\nu$      | 50.0  | 53.0  |

The glasses herein described are of the non-silicate type more broadly covered in Reissue Patent No. 21,175, Morey, over which they are specific improvements.

While the Morey patent disclosed the wide field within which useful glasses might be found, this field is not of uniform productiveness. The various oxides cannot be combined in all proportions to obtain equally useful glasses; nor are they all compatible in all proportions to make a glass without tendency to crystallize or devitrify. This application relates to a particular area of that field that has been found to have definite utility in the designing of lenses and optical instruments.

In the examples given, although the percentages are precisely given and these are preferred, it is to be understood that variations in these proportions and addition of other oxides in small quantities are contemplated provided these changes are within the ranges, and the resulting proportions are of the order of those given in the claims. Such changes will naturally result in variations in the optical properties. All such modifications and equivalents I consider as within the scope of my invention.

Having thus described my invention, what I claim is:

1. An optical glass having an index of refraction of the order of 1.66 and an Abbe value of the order of 53 and consisting of the oxides of the following elements present in proportions by weight of the order given: boron, 36 parts; thorium, 12 parts; lanthanum, 12 parts; barium, 20 parts; magnesium, 20 parts.

2. An optical glass having an index of refraction of the order of 1.66 and an Abbe value of the order of 53 and consisting of the oxides of the following elements present in proportions by weight of the order given: boron, 36 parts; thorium, 12 parts; lanthanum, 12 parts; barium, 20 parts; calcium, 20 parts.

3. An optical glass having an index of refraction of the order of 1.66 to 1.69 and an Abbe value of the order of 50 to 53 and consisting of 36 parts boric oxide, 12 parts thorium oxide, 12 parts lanthanum oxide, 20 parts barium oxide, and 20 parts of an oxide selected from the group consisting of calcium oxide and magnesium oxide.

PAUL F. DE PAOLIS.

REFERENCES CITED

The following references are of record in the file of this patent:

UNITED STATES PATENTS

| Number    | Name         | Date          |
|-----------|--------------|---------------|
| Re. 21,175 | Morey       | Aug. 15, 1939 |
| 2,241,249 | Eberlin et al. | May 6, 1941 |